Patented Dec. 12, 1950

2,534,017

UNITED STATES PATENT OFFICE 2,534,017

CATALYST RECOVERY PROCESS

William F. Gresham and William E. Grigsby, Wilmington, Del., assignors to E. I. du Pont de Nemours & Company, Wilmington, Del., a corporation of Delaware No Drawing. Application April 23, 1948,
Serial No. 22,948

7 Claims. (Cl. 23—205)

This invention relates to a novel process for the direct recovery of hydrogen fluoride and boron trifluoride from tolualdehyde-HF-BF$_3$ compositions.

In the copending application of W. F. Gresham and G. E. Tabet, Serial No. 692,936, filed August 24, 1946, now Patent No. 2,485,267, it is disclosed that p-tolualdehyde and other similar aromatic aldehydes can be prepared by reaction between carbon monoxide and aromatic hydrocarbons in the presence of a hydrogen fluoride-boron trifluoride catalyst at temperatures of about −80° to +50° C. under superatmospheric pressure. The reaction product obtained in this process for reacting carbon monoxide with aromatic hydrocarbons in the presence of a hydrogen fluoride-boron trifluoride catalyst evidently contains an addition compound or complex of aromatic aldehyde, hydrogen fluoride, and boron trifluoride. As an example, the said application S. N. 692,936 discloses that when a mixture containing 0.5 mol of toluene, 0.75 mol of hydrogen fluoride, and 0.75 mol of boron trifluoride was maintained at a temperature of −18° to +2° C. for thirteen minutes under a carbon monoxide pressure of 75 to 710 atmospheres, the conversion of toluene to p-tolualdehyde was 80.5% based on the amount of toluene not reacted, and the yield was 92% of the theoretical. One method for removing the catalyst from the resulting reaction product was by water wash. The present invention is concerned with a novel process for the separation of the catalyst from the aldehyde in the said reaction product.

In the copending application of W. F Gresham, Serial No. 709,423, filed November 13, 1946, now U. S. Patent No. 2,462,739, a method for the separation of hydrogen fluoride-boron trifluoride from the aldehyde in the aforesaid reaction product is disclosed. This method involves heating a mixture (or complex) of aromatic aldehyde and hydrogen fluoride-boron trifluoride catalyst with a metal fluoride of the class consisting of alkali metal and alkaline earth metal fluorides, whereby both the hydrogen fluoride and the boron trifluoride become combined with the said metal fluoride, and thereafter separating the aldehyde from the resulting combination of hydrogen fluoride, boron trifluoride and metal fluoride. The method for recovering hydrogen fluoride and boron trifluoride described in the said copending application Serial No. 709,423 is somewhat costly, however. Thus, when the metal halide employed is lithium fluoride, the separation of hydrogen fluoride and boron trifluoride from the complex is accomplished by pyrolysis at a temperature within the range of about 250° to 400° C.; this is an efficient process, but it requires expensive equipment adapted for recovery of the BF$_3$ from the solid mixture at these high temperatures.

In general, the separation of hydrogen fluoride and boron trifluoride from the tolualdehyde-HF-BF$_3$ composition is made difficult by the fact that HF-BF$_3$ catalysts cause the aldehyde to undergo condensation reactions, especially at elevated temperatures.

An object of this invention is to provide a relatively inexpensive method for the separation of hydrogen fluoride and boron trifluoride from combinations thereof with aromatic aldehydes without intermediate formation of a metal fluoride-hydrogen fluoride-boron trifluoride complex. Other objects of the invention will appear hereinafter.

It has been discovered, in accordance with the present invention, that the aforesaid objects can be accomplished by evaporating hydrogen fluoride selectively from the aldehyde-HF-BF$_3$ composition, preferably at a pressure in the range of 2 to 500 mm., and thereafter separating BF$_3$ from the resulting tolualdehyde-BF$_3$ residue. This can be done by heating the said residue in the presence of an inert organic liquid such as toluene at a temperature of about 75° to 120° C., whereby boron trifluoride is expelled from the mixture, recovering the said inert liquid by distillation and thereafter distilling tolualdehyde, free of boron trifluoride, from the distillation residue. Other methods for separating BF$_3$ from the residue, after the HF removal step, include: (1) extraction with water followed, if desired, by separation of BF$_3$ from the aqueous extract by the method disclosed in U. S. 2,160,576, and (2) expelling a part of the BF$_3$ by heating the tolualdehyde-BF$_3$, preferably in the presence of an inert diluent, and extracting the rest of the BF$_3$ by water, in accordance with the process above-mentioned.

The present invention is based, in part, upon the discovery that, while a mixture of tolualdehyde, hydrogen fluoride, boron trifluoride gives rise to the formation of high-boiling reaction products, especially when heated at temperatures above about 65° C., the said high-boiling products are not obtained in excessive amounts, even at these elevated temperatures, if hydrogen fluoride is first evaporated from the mixture, e. g. at relatively low temperature and pressure. The invention is also based in part upon the discovery that, once the hydrogen fluoride has been removed selectively from the mixture by evaporation at subatmospheric pressure at temperatures below about 95° C., preferably below 65°-75° C., boron trifluoride can be expelled by heating the resulting mixture in the presence of an inert liquid, such as toluene, at a temperature of about 75° to 120° C., at substantially atmospheric pressure in a vessel equipped with a reflux condenser, without excessive loss of the tolualdehyde to condensation products.

The initial mole ratio of HF:BF$_3$ which may be present in the aldehyde-HF-BF$_3$ mixture may be varied rather widely but is generally within the range of 1:5 to 5:1. A large excess of hydrogen fluoride is generally neither necessary nor desirable, because the removal of large amounts of hydrogen fluoride by direct evaporation, even at low pressures, is somewhat time-consuming, and by-product formation occurs to some extent during this evaporation of hydrogen fluoride, such formation of by-product being at a minimum when the temperature and pressure are kept below about 65° C. Best results are obtained when the initial mole ratio of hydrogen fluoride-BF₃ is about 1:1.

If desired, evaporation of hydrogen fluoride from the tolualdehyde-HF-BF₃ composition can be effected in a current of inert gas, e. g., nitrogen, carbon monoxide, carbon dioxide, etc.

It is not essential that toluene or other such inert diluent be present in the reaction mixture during the hydrogen fluoride removal step, although at least small amounts of toluene are generally present in the reaction mixture obtained by reacting toluene with carbon monoxide at low temperatures and high pressures in the presence of a hydrogen fluoride-boron trifluoride catalyst. The presence of the diluent (preferably a hydrocarbon, such as toluene, cetane, etc.) in the reaction mixture after the hydrogen fluoride has been removed is, however, highly desirable, and in fact is necessary if best results are to be obtained.

In the embodiment of the invention in which the BF₃ is recovered by heating tolualdehyde-BF₃ in the presence of toluene the mole ratio of toluene:tolualdehyde which should be present in the reaction mixture during the recovery of BF₃ by heating at 75° to 120° C. after the hydrogen fluoride has been removed may be varied rather widely but should be within the range of about 0.1:1 to about 10:1 for best results. The mole ratio of tolualdehyde:HF:BF₃ generally depends upon the percentage conversion of toluene to tolualdehyde in the tolualdehyde synthesis operation. For example, when equimolar proportions of hydrogen fluoride and boron trifluoride are employed, the mole ratio of tolualdehyde:HF:BF₃ is generally about 0.5:1:1 to about 1:1:1. After the boron trifluoride has been expelled from the reaction mixture at a temperature of 75 to 120° C. in the practice of this invention, the toluene is generally recovered from the resulting mixture by direct distillation. In preferred embodiments, this is accomplished by distilling the mixture at subatmospheric pressures. After the toluene cut has been collected, the distillation temperature increases to the boiling point of tolualdehyde, and tolualdehyde fraction is taken over. If the removal of boron trifluoride has not been complete, a distillation residue containing tolualdehyde-boron trifluoride complex remains after the distillation of the tolualdehyde. It is frequently desirable to avoid decomposition of this complex by carrying out the distillation of the tolualdehyde at a sufficiently low pressure so that the distillation temperature is not in excess of about 75° C. Any tolualdehyde-boron trifluoride complex remaining as a distillation residue can be separated into its ingredients by adding toluene and repeating the boron trifluoride separation step, i. e. by heating the mixture at 75° to 120° C. When the evolution of boron trifluoride ceases, the toluene and tolualdehyde can be recovered from the resulting mixture preferably by distillation at diminished pressure. In certain instances, a small amount of tolualdehyde-boron trifluoride complex may still remain. If desired, this can be processed again with toluene for recovery of additional quantities of boron trifluoride and tolualdehyde. Water and air should preferably be excluded from the reaction mixture during these operations.

The invention is illustrated further by means of the following examples.

*Example 1.*—A mixture consisting of 0.52 mole p-tolualdehyde, 0.97 mole HF and 0.40 mole BF₃ was placed in a copper distilling flask, and the hydrogen fluoride in the mixture was evaporated at a pressure of 6 mm. by heating at 55° to 82° C. (bath temperature) for an hour. The hydrogen fluoride thus evolved was absorbed in a water scrubber and a cold trap operating at —80° C. After the hydrogen fluoride had thus been removed from the mixture in the copper flask, toluene (1.87 moles) was added, and the mixture was heated under refluxing conditions at atmospheric pressure for 78 minutes, during which time evolution of boron trifluoride occurred. The toluene was then removed from the resulting residue by distillation at 100 mm. pressure, after which the p-tolualdehyde was recovered by distillation at a pressure of 1 mm. Distillation of the p-tolualdehyde was continued until crystals of BF₃-p-tolualdehyde started to sublime in the distilling column. The vacuum was then released and the column was washed down with dry toluene, 1.87 moles. The mixture was again refluxed for 1 hour, vacuum distilled again, and then refluxed for a third time with added toluene at atmospheric pressure. About 75% of the p-tolualdehyde charged was recovered during the first and second cycles; only 2% of the tolualdehyde was lost by conversion to high-boiling by-products. The reactor weight losses during the various heating periods totalled 48.0 grams (weight of HF and BF₃ charged, 46.7 grams).

*Example 2.*—A mixture of 0.5 mole dry toluene, 0.5 mole HF, and 1 mole BF₃ was charged into a stainless steel shaker tube which had been freed of air by flushing with nitrogen. This mixture was reacted in a shaker tube with carbon monoxide at —38° to —28° C. for 26 minutes at a pressure of 360 to 450 pounds per square inch. The gases were vented from the cold shaker tube, and the liquid reaction product was discharged into a nitrogen-flushed copper flask which was promptly connected with a copper distilling column. Vacuum distillation of hydrogen fluoride was then carried out for 94 minutes at 9 mm. pressure, the heat for the distillation being supplied by a bath operated at a temperature of 70° to 85° C., the distillation temperature being considerably below the temperature of the bath. After removal of the hydrogen fluoride, dry toluene (1.87 moles) was added to the flask, and the mixture was refluxed at atmospheric pressure for 80 minutes, during which time evolution of boron trifluoride occurred. The toluene and part of the p-tolualdehyde in the mixture were recovered by distillation at diminished pressure, the distillation of the p-tolualdehyde being continued until BF₃-p-tolualdehyde complex began to appear in the distilling column, i. e. no more free tolualdehyde could be distilled. At this point toluene was added, and the refluxing and vacuum distillation cycle was repeated twice. The amount of p-tolualdehyde recovered corresponded to a conversion of 55%, based upon the amount of toluene initially present in the synthesis step. Of the material boiling above toluene, 89% was p-tolualdehyde and only 11% was tar.

*Example 3.*—The process of Example 2 was repeated except that the charge had the composition ca.6.4HF:1 toluene:1 BF₃ (molar quantities). The conversion to directly recovered p-tolualdehyde was 72% and the yield was 84%, based upon the toluene not recovered. About 85% of the material boiling above the boiling point of toluene was p-tolualdehyde. In this experiment there was an essentially quantitative recovery of HF and BF₃.

*Example 4.*—The process of Example 2 was simulated except that the diluent introduced after the hydrogen fluoride recovery step was cetane instead of toluene. About 78% of the p-tolualdehyde was recovered, together with 69% of the BF₃ and 81% of the HF. In another experiment, BF₃-p-tolualdehyde was heated in the presence of diphenyl at 153° C. for 2 hours; this caused evolution of 71% of the boron trifluoride present in the mixture. In still another experiment no diluent was added and the tolualdehyde-BF₃ was stripped of BF₃ by countercurrent scrubbing with water; the aqueous effluent contained 2.6 moles of water per mole of BF₃.

*Example 5.*—A mixture consisting of 1.19 moles p-tolualdehyde, 0.82 mole BF₃ and 1.16 mole dry toluene was refluxed at atmospheric pressure for 253 minutes, and then vacuum distilled using a 65° water bath to supply the heat needed for the distillation. This distillation gave 107.7 grams of p-tolualdehyde which corresponds to 1 gram of aldehyde per gram of toluene diluent used. Three more cycles were carried out with added toluene, as in the preceding examples; in the last cycle, 0.31 gram of aldehyde was obtained per gram of toluene used. About 89% of the p-tolualdehyde initially present was directly recovered, another 2% remaining in the residue.

It is to be understood that the foregoing examples are illustrative only and that numerous methods for practicing the invention will occur to those who are skilled in the art. For example, it may be convenient to distill the toluene and tolualdehyde at low temperature (below 75°, under subatmospheric pressure) and to recycle distillation residues containing tolualdehyde and boron trifluoride to the synthesis unit where additional quantities of tolualdehyde are synthesized from toluene and carbon monoxide under the conditions disclosed in the copending application Serial No. 692,936.

The necessity of evaporating HF selectively, prior to recovery of BF₃ is illustrated as follows:

A charge of 2 moles toluene, 0.5 mole p-tolualdehyde, 0.35 mole HF, and 0.35 mole BF₃ gave an 84% direct recovery of p-tolualdehyde in four cycles, each cycle comprising a period of reflux at atmospheric pressure in toluene followed by a low temperature distillation of toluene and p-tolualdehyde. On the other hand, a similar mixture containing more HF (2 moles toluene, 0.5 mole p-tolualdehyde, 1.06 moles HF, 0.5 mole BF₃) gave a large quantity of high-boiling by-product and only 38% p-tolualdehyde recovery under similar conditions.

Since many different embodiments of the invention can be made without departing from the spirit and scope thereof, it is to be understood that we do not limit ourselves except as set forth in the following claims.

We claim:

1. In a process for separating hydrogen fluoride and boron trifluoride from a tolualdehyde-HF-BF₃ composition, the step which comprises evaporating hydrogen fluoride selectively from the said composition, whereby a residue comprising tolualdehyde and BF₃ is obtained, and thereafter separating boron trifluoride from the resulting mixture.

2. In a process for separating hydrogen fluoride and boron trifluoride from a tolualdehyde-HF-BF₃ composition, the step which comprises evaporating hydrogen fluoride from the said composition at a pressure in the range of 2 to 500 mm., whereby a residue comprising tolualdehyde and BF₃ is obtained, and thereafter separating boron trifluoride from the resulting mixture by heating the same in the presence of an inert liquid at a temperature within the range of 75° to 120° C.

3. A process for separating hydrogen fluoride and boron trifluoride from tolualdehyde-HF-BF₃ compositions which comprises evaporating hydrogen fluoride from a tolualdehyde-HF-BF₃ composition at a pressure in the range of 2 to 500 mm., thereafter heating the resulting mixture in the presence of toluene at a temperature within the range of 75° to 120° C., whereby boron trifluoride is evolved, recovering the said toluene by distillation and thereafter distilling tolualdehyde from the resulting residue, the distillation of the toluene and tolualdehyde being conducted at a temperature not in excess of 75° C., at subatmospheric pressure.

4. The process of claim 3 in which the mole ratio of HF:BF₃ is initially from 1:5 to 5:1.

5. The process of claim 3 in which the mole ratio of HF:BF₃ is initially 1:1.

6. The process of claim 3 in which the mole ratio of toluene-tolualdehyde is within the range of 1:1 to 10:1.

7. In a process for separating hydrogen fluoride and boron trifluoride from tolualdehyde-HF-BF₃ compositions, the steps which comprise evaporating hydrogen fluoride selectively from a tolualdehyde-HF-BF₃ composition at a pressure in the range of 2 to 500 mm., thereafter introducing toluene into the resulting mixture until the mole ratio of toluene:tolualdehyde is within the range of 0.1:1 to 10:1, heating the resulting mixture at the boiling point, whereby evolution of boron trifluoride occurs, recovering the said toluene by distillation at a temperature not in excess of 75° C. at subatmospheric pressure, recovering tolualdehyde from the resulting residue by distillation at subatmospheric pressure at a temperature not in excess of 75° C., continuing the said distillation of p-tolualdehyde, thereafter heating the resulting residue with additional toluene at a temperature of 75° to 120° C., whereby boron trifluoride is evolved, and thereafter recovering toluene and tolualdehyde from the resulting mixture by distillation at a temperature below 75° C. at subatmospheric pressure.

WILLIAM F. GRESHAM.
WILLIAM E. GRIGSBY.

REFERENCES CITED

The following references are of record in the file of this patent:

UNITED STATES PATENTS

| Number | Name | Date |
|---|---|---|
| 2,160,575 | Loder | May 30, 1939 |
| 2,320,629 | Matuszak | June 1, 1943 |
| 2,386,798 | Hughes | Oct. 16, 1945 |
| 2,430,516 | Lien et al. | Nov. 11, 1947 |

FOREIGN PATENTS

| Number | Country | Date |
|---|---|---|
| 486,563 | Great Britain | of 1938 |